(12) United States Patent
Ng et al.

(10) Patent No.: US 7,253,828 B2
(45) Date of Patent: Aug. 7, 2007

(54) EXPOSURE-ENERGY-DENSITY AND DYNAMIC EFFECT BASED UNIFORMITY CORRECTION FOR LED PRINTHEADS

(75) Inventors: Yee S. Ng, Fairport, NY (US); Stacy M. Munechika, Fairport, NY (US); Dennis R. Kamp, Churchville, NY (US); Lawrence W. Fisher, Fishers, NY (US)

(73) Assignee: Eastman Kodak Company, Rochester, NY (US)

( * ) Notice: Subject to any disclaimer, the term of this patent is extended or adjusted under 35 U.S.C. 154(b) by 328 days.

(21) Appl. No.: 10/903,072

(22) Filed: Jul. 30, 2004

(65) Prior Publication Data

US 2006/0023017 A1 Feb. 2, 2006

(51) Int. Cl.
*B41J 2/435* (2006.01)
*B41J 2/45* (2006.01)

(52) U.S. Cl. .................. 347/236; 347/238

(58) Field of Classification Search ........ 347/251–254, 347/236, 238
See application file for complete search history.

(56) References Cited

U.S. PATENT DOCUMENTS

| | | | | |
|---|---|---|---|---|
| 5,585,836 A | * | 12/1996 | Pham et al. | 347/237 |
| 5,586,055 A | * | 12/1996 | Ng et al. | 702/90 |
| 6,554,388 B1 | * | 4/2003 | Wong et al. | 347/19 |
| 6,982,813 B2 | * | 1/2006 | Hirata et al. | 358/1.9 |
| 2004/0100552 A1 | * | 5/2004 | Taira et al. | 347/236 |
| 2004/0183457 A1 | * | 9/2004 | Kondo et al. | 315/169.3 |

* cited by examiner

*Primary Examiner*—Hai Pham
*Assistant Examiner*—Kainoa Wright
(74) *Attorney, Agent, or Firm*—Lawrence P. Kessler

(57) ABSTRACT

A method for calibrating a printer including a light-emitting diode (LED) printhead for non-uniformity on an image plane. The LED recording elements are arranged in a plurality of arrays. A plurality of characteristics (102, 104, 106, 108, 110) associated with each recording element are measured and from the measured characteristics a plurality of parameters (112, 114, 116, 118, 120) associated with each recording element is determined. Adjustment factors for a plurality of parameters are combined mathematically to determine an adjusted power density (122) for each recording element on the image plane. Correction factors (130) are then assigned to each recording element to correct for the adjusted power density (122). The correction factors (130) are stored in a memory (132) associated with the LED printhead.

40 Claims, 3 Drawing Sheets

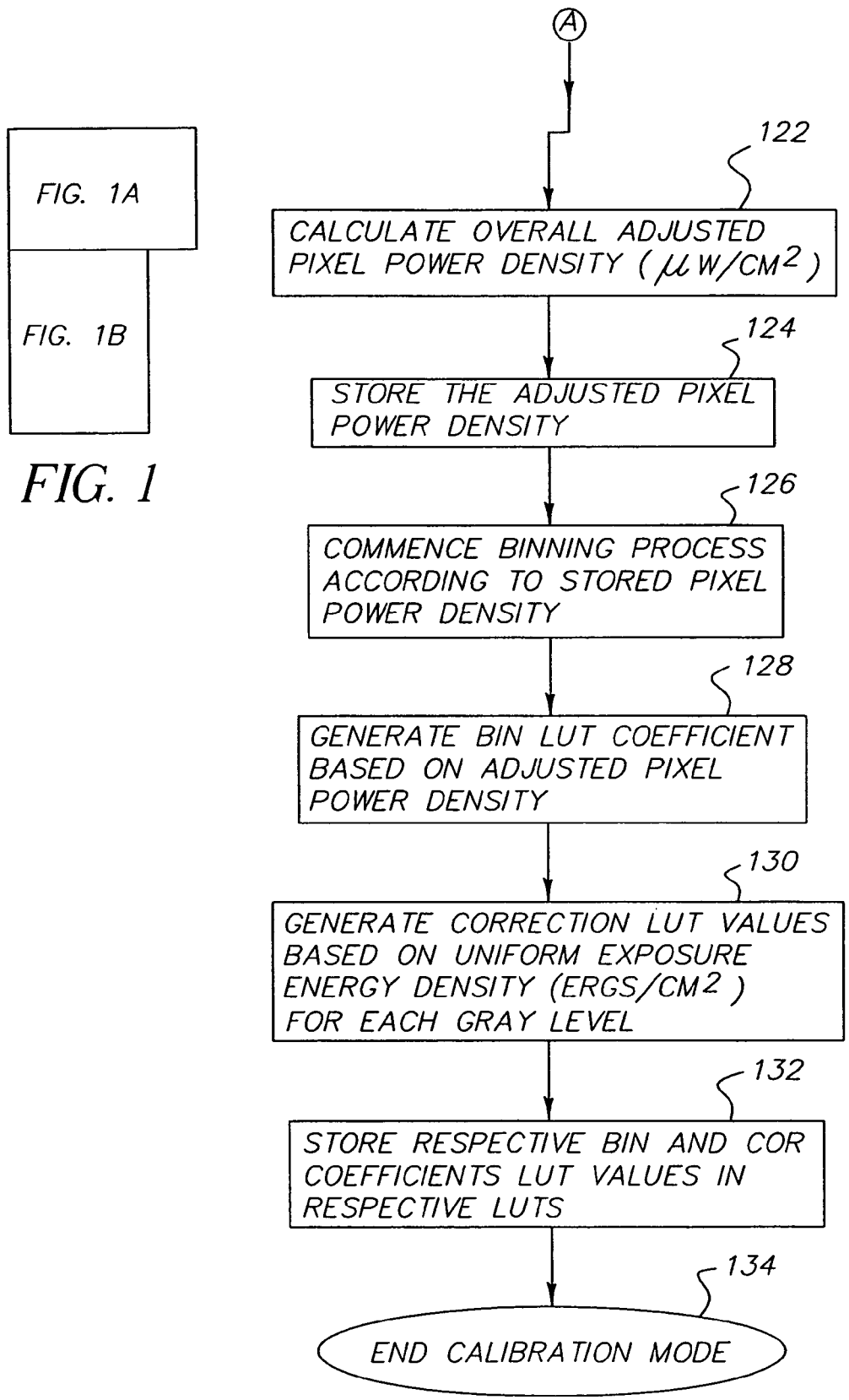

EXPOSURE-ENERGY-DENSITY AND DYNAMIC EFFECT BASED UNIFORMITY CORRECTION FOR LED PRINTHEADS

FIELD OF THE INVENTION

The present invention relates generally to a method of calibrating LED writers (printheads), and more particularly, to a method for correction for non-uniformity errors associated with such writers.

BACKGROUND OF THE INVENTION

Light-Emitting Diode (LED) non-impact printing apparatus uses an LED printhead as a light source within the imaging device. The printhead is essentially a line of LEDs the width of a page and is used for printing on ordinary paper using electrophotographic reproduction apparatus. The LED printhead is solid state and has no moving parts. The LED printhead creates the image on the print drum as the drum moves down.

Light-Emitting Diode (LED) printheads (also referred to as writers) typically contain a series of contiguous LED linear array chips which are imaged onto a photoconductor receptor by means of a gradient-index lens (e.g., Selfoc "self focusing" lens available from Nippon Sheet Glass Co.). Gradient-index (GRIN) lenses have a graded refractive index that is a maximum at the center of the lens and decreases quadratically towards the outer edge. This smoothly varying index of refraction causes incident rays of light to refract within the lens and converge towards a point of focus. The LEDs associated with each LED array chip are typically activated by a driver integrated circuit that provides a prescribed amount of current to a given LED for a prescribed duration.

It is known in the art of non-impact printing that correction of the LED recording elements is often required due to non-uniformity in light output of these elements. Typically, a non-uniformity correction look-up table (LUT) is provided to adjust exposure times so that at any required gray level all LEDs can be enabled to output a uniform amount of exposure energy. This can be achieved by adjusting exposure times and/or intensities so that weaker emitters are enabled for longer exposure times than stronger emitters in order for the exposure energy from each emitter to be uniform. The LUT is typically a 256 byte array for each color band containing the output values that are computed. Input pixel values operate as an index into the table. LUT functionality provides a procedure that computes the output values once. Thereafter, every pixel call returns the corresponding computed value. For a typical LED printhead of approximately 4000 LEDs, a LUT memory can represent the grading of the LEDs into 256 categories according to their respective brightness levels.

LED printheads typically have pixel irradiance non-uniformity on the image plane due to pixel-to-pixel brightness differences for LED emitters as well as non-uniformity of transmission. Even if the same current is driven through each LED, LEDs respond differently and their light outputs vary. Exposure uniformity correction either via exposure time modulation, such as using pulse-width-modulation (PWM), or pixel drive-current trimming, has been used before to correct for the pixel intensity non-uniformity on the image plane. For the typical PWM or drive-current trimming uniformity correction scheme, the assumption is that only the integrated irradiance of the pixel on the image plane is assumed to be non-uniform from pixel to pixel. These uniformity-correction schemes do not account for variations in the pixel size, spacing, or the LED on-time characteristics.

In the case where the size of an LED pixel irradiance spot on the image plane is different than the nominal spot size (either due to modulation transfer function (MTF) differences across the width of the optics, or due to the LED emitter mask size/dopant variation between LED arrays), then the typical non-uniformity correction method that uses integrated pixel-intensity correction only will have some residual exposure non-uniformity due to the pixel-size variation effect which creates variation in exposure density (area coverage).

Although LEDs are uniformly spaced or pitched because of the accuracy of the photolithographic fabrication process, the spacing between LEDs at the end of butting LED arrays does not have this uniformity of pitch. Therefore, the effective exposure power density can also vary across the LED arrays due to pixel-spacing variations caused by LED array butting-gap deviations, or optics-induced image-shift errors. The pixel-spacing variation creates a difference between the actual pixel spacing and the nominal pixel pitch within an array. In the case of a pixel-spacing variation due to a spacing error at the butting gap between end pixels of adjacent LED arrays, the exposure-power density across the gap region will be different than the power density at nominal pitch. Under this situation, an exposure-density modification for correcting for the butting-gap pitch error can be made by altering the pixel-brightness of the end pixels located at the array gap. This essentially maintains an effective equivalent exposure energy density at the butting gap compared to the rest of the pixels within an array. An analogous case can be made for other pixel-spacing errors caused by the Selfoc lens. The misalignment of the gradient-index rods in the Selfoc lens can create an image-shifting error which can lead to an altering of the effective pixel spacing, thus creating a variation in the exposure density.

Pixel-exposure variation can also be attributed to variations in the on-time characteristics due to dynamic effects where the LED rise time and steady-state level are affected by the number of pixels activated. Specifically, the LED and driver combination can be subject to current-starvation characteristics whereby the resultant integrated exposure of an individual LED pixel can change (typically decreases) depending on the total number of LEDs that are activated. When a single LED is activated, the overall printhead has minimal current loading and the LED is not "starved" for current. When a majority of LEDs are activated, as is the case in flat-field printing, the current loading is high and the individual LED may degrade slightly in light output due to current starvation. The level of degradation may or may not be uniform. Even with constant-current driver designs or current-compensating driver designs, there can still exist noticeable levels of nonuniformity due to individual component variation and printhead assembly manufacturing variation.

The dynamic effects of current starvation can affect the exposure by reducing not only the overall steady-state power output, but also by altering the LED rise time to create a nonlinearity between the integrated LED on-time and the integrated pixel exposure. In conventional on-time based uniformity-correction schemes, brighter LEDs are programmed to have shorter on-times than dimmer LEDs. Therefore, in a typical flat-field printing situation, the brighter LEDs are affected by the current-starvation effects more than the dimmer LEDs which are compensated with a longer activation time. The uniformity can be degraded in the case of high brightness pixels being activated for very short on times for low gray level printing.

To resolve these problems in the art, a more effective uniformity-correction method must take into consideration not only the LED pixel irradiance differences, but also the pixel-size variation, the pixel-spacing variation, and the dynamic current-starvation effects to correct for the residual exposure non-uniformity on the image plane.

SUMMARY OF THE INVENTION

In order to correct for the exposure non-uniformity of LED pixels on the image plane, pixel variations associated with each pixel's irradiance difference, dynamic effects, size and spacing difference on the image plane all need to be taken into consideration. So an exposure energy density (ergs/cm2) that takes into consideration pixel size and spacing as well as pixel irradiance, type of uniformity correction with dynamic effects consideration is more appropriate than just an integrated pixel irradiance (μW/dot) only correction. In order to do that, both the pixel irradiance (μW/dot), the pixel position (e.g., pixel pitch), the pixel size (or shape due to MTF variation), and the current-starvation effects all need to be measured. The exposure energy density correction then can be made after dynamic effects are taken into consideration.

In one aspect of the invention, a method is provided for calibrating a printer with a light-emitting diode (LED) printhead for brightness non-uniformity on an image plane. The LED recording elements are arranged in a plurality of arrays. A plurality of characteristics associated with each recording element are measured and from the measured characteristics a plurality of parameters associated with each recording element is determined. Adjustment factors for a plurality of parameters are combined mathematically to determine an adjusted power density for each recording element on the image plane. Correction factors are then assigned to each recording element to correct for the adjusted power density. The correction factors are stored in a memory associated with the LED printhead.

BRIEF DESCRIPTION OF THE DRAWINGS

The invention is better understood by reading the following detailed description of the invention in conjunction with the accompanying drawings.

DETAILED DESCRIPTION OF THE INVENTION

Figure 1A:
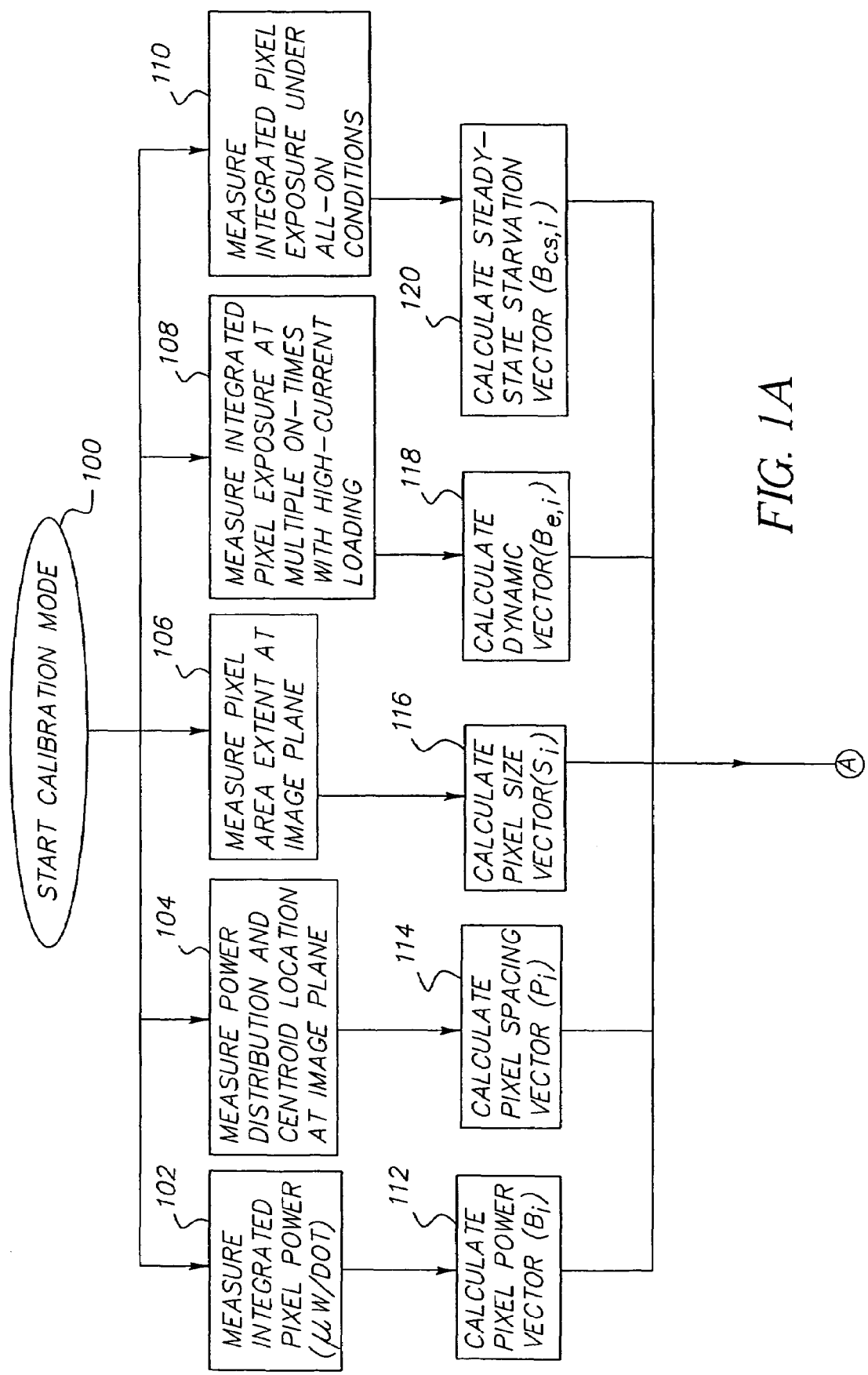
FIG. 1 illustrates the processing logic for exposure energy density uniformity correction in accordance with an exemplary embodiment of the present invention.

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

A method for non-uniformity correction of an LED printhead resulting from improperly spaced end LEDs is described in U.S. Pat. No. 5,586,055 to Ng, et al. which is incorporated by reference in its entirety herein. A method for improved correction of exposure parameters using LED printheads is described in U.S. Pat. No. 5,818,501 to Ng, et al. which is incorporated by reference in its entirety herein.

As described more fully in U.S. Pat. No. 5,818,501, a non-impact printhead generally includes a plurality of recording elements (e.g., LEDs), a memory for storing prebinned data representing recording characteristics relative to the recording elements, and an output device for outputting the prebinned data to a controller located off the printhead for generating tables for correction of non-uniformity of the recording elements. The prebinned data includes (a) data that associates recording elements with bins, and (b) data relative to a characteristic of each bin. The corrected images to be printed are generated using the tables. The corrected image data is transmitted to the printhead for use in recording.

At a printer exposure station, projected light from the write head or printhead dissipates the electrostatic charge on a photoconductive belt to form a latent image of a document to be copied or printed. The printhead LED array exposes the photoconductive belt pixel by pixel with an intensity that is regulated by current drivers on the printhead. As more fully described in U.S. Pat. No. 5,586,055, each driver chip includes circuitry for addressing the logic associated with each LED to control whether or not each of the LEDs should be energized, as well as to determine the level of current to each of the LEDs controlled by that driver chip. The current level to each LED driven by a particular driver chip is the same but the pulse duration for each LED during each line of print is varied. The integrated circuit driver chips receive appropriate signals for use in generating test exposure timing signals for controlling the on-time for each LED. A table of memory (LUT) is provided for each LED and indicates for the LED a corresponding exposure time for each gray level it is to print. The Selfoc lens or gradient-index lens focuses light from the LEDs onto a photosensor placed at the focal plane of the lens. A motor is coupled to a mirror and/or photosensor to step from LED to LED. The output of the photosensor is an analog signal that is input to an analog to digital converter for input into a logic and control unit (LCU). The LCU controls stepping of the motor, photosensor, and/or mirror and includes a microcomputer programmed for calculating exposure times.

FIG. 1 illustrates the processing logic for exposure energy density uniformity correction of the present invention. A radiometric calibration procedure is performed (step 100) to determine the LED power (step 102), spot size (step 106), spacing (step 104) and rise-time response (step 108) under current-starvation conditions. A radiometric instrument fitted with the appropriate optics and a solid-state detection array with controllable integration rate can be configured to acquire the radiometric and geometric characteristics of each LED under the various patterns and on-time intervals. The measurement parameters of pixel size, pitch, rise-time and steady-state current starvation are then used to modify the integrated irradiance measurement of each LED.

After measurement of the integrated pixel power (step 102), the irradiance value (Bi) of each LED on the image plane is recorded, as indicated in step 112. The pitch (Pi,i+1)

between the power centroids of two pixels is also recorded as indicated in step 114, and the pixel size is estimated based on the power density distribution of the pixel and a pre-selected threshold power value to define the size of the exposed pixel (step 116). The size of the pixel is estimated to be Si for the ith pixel as determined by using equation (2) described below.

For a nominal size pixel (Sn) there is a nominal pitch (Pn). As an example, for a 600 dpi printhead, the nominal width of the exposed pixel with a threshold power point of ~10% peak power of this pixel is ~63 μm; the nominal pitch is 42.3 μm. In the case of pitch error (such as in the butting gap correction case), if the distance (P i, i+1) between the power centroids of two pixels is larger than the nominal pitch, the pixel is not as effective as a regular exposure spot. In effect, it behaves likes a weaker pixel than its measured irradiance (Bi) indicates. To correct for such problem in the butting gap area, the effective brightness for the pixel due to pitch error is Bp,i, where:

$$B_{p,i} = B_i * \{1-(P_{i,i+1}-P_n)*a\} \quad (1)$$

In this case, a is a positive number that adjust for pixel overlap and process gain effect and (Pi, i+1−Pn) is the pitch error.

Pitch error between pixels are not restricted to the end pixels on adjacent LED arrays (butting error). Pitch error can be due to lens rod alignment error within the Selfoc array, or the deviation of the power distribution centroids between pixels within an array. Similar corrections to those in Equation (1) to the effective pixel brightness can be done to the pixels that experience such a problem.

If the 10% peak power threshold size (Si) of pixel i is smaller than Sn, that means the actual exposure spot and resultant printed-area coverage is smaller. Pixel i is not as effective for exposure due to the undersized pixel. It is almost equivalent to a less bright pixel. It is also similar to the case in which the distance between pixels is too large. So the effective brightness of the pixel due to size error is Bs,i where:

$$B_{s,i} = B_i * \{1-(S_n-S_i)*b\} \quad (2)$$

In this case, b is a positive number that adjusts for pixel overlap and process gain effect and (Sn−Si) is the pixel size error.

If the pixel has both pitch and size error, then the effective pixel brightness Be,i can be determined as follows:

$$B_{e,i} = B_i * \{1-(P_{i,i+1}-P_n)*a\} * \{1-(S_n-S_i)*b\} \quad (3)$$

In a flat field, most of the other pixels are turned on when the brighter pixels are on, so there is more of a current starvation effect for the brighter pixels. For the weaker pixels, during some of the on-times, many other brighter pixels have been turned off in a flat field, so there is less effect on the weaker pixels due to current starvation. Since the dynamic effect affects the brighter pixels more than the weaker pixels, if the shortest exposure is much larger than the rise and fall time of the current pulse, then the dynamic effect that must be dealt with is the current starvation effect that penalizes the brighter pixels more than dimmer pixels. The higher brightness pixel is adjusted to be less bright than the nominal brightness. In order to accommodate this condition, the dynamic corrected pixel brightness B d,i can be expressed as $$B_{d,i} = B_m * ((B_{e,i}/B_m - a1*((B_{e,i}/B_m - b1) + abs(B_{e,i}/B_m - b1))**c1)) \quad (4)$$

Figure 2:
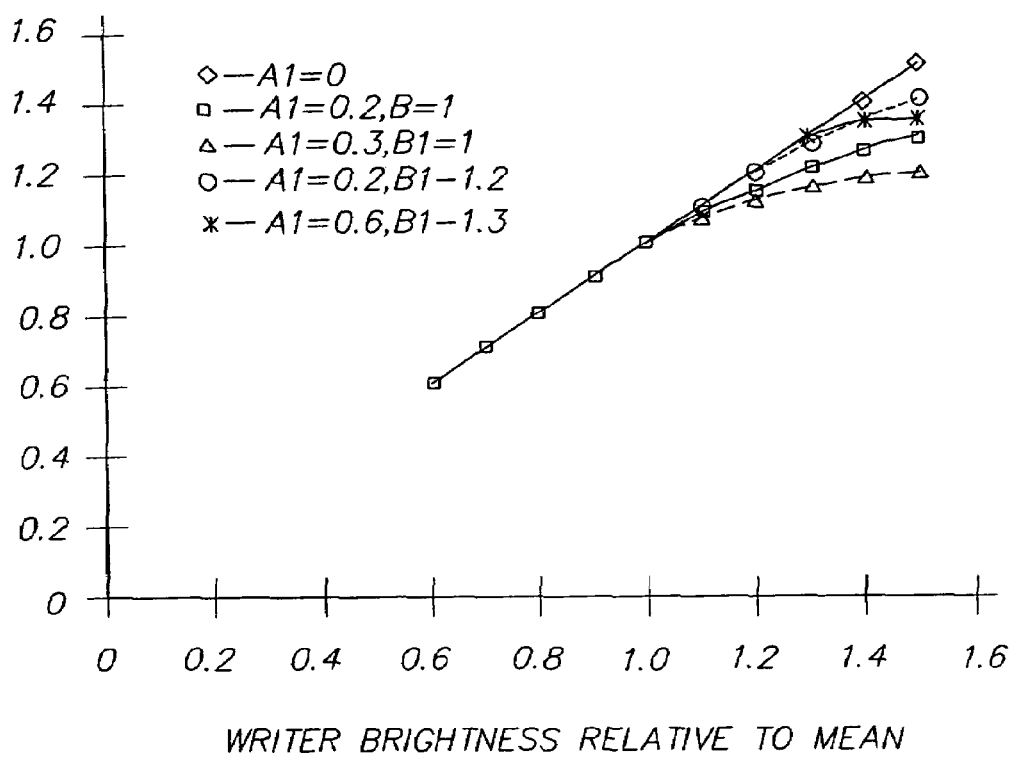
FIG. 2 illustrates an exemplary plot of dynamic printhead brightness compensation.

In equation (4), Bm is the targeted mean pixel brightness, Be,i/Bm is the writer pixel (pixel i) brightness relative to the mean (before adjustment) and a1, b1 and c1 are adjustable parameters. The Be,i/Bm range is from 0.6 to 1.5, which covers a wide range of pixel brightness within a printhead. The example illustrated in FIG. 2 plots the modified dynamic writer brightness relative to the mean (Bd,i/Bm), assuming c1=1.5 for a few of the a1 and b1 parameter examples. The a1 and b1 values can be empirically determined from the measurement data. The parameter a1 is used to adjust the magnitude of the starvation effect and the parameter b 1 is used to define relative brightness point at which the effect starts. In these exemplary test cases, the starvation effect is assumed to start at the higher brightness end of the pixel brightness distribution (i.e., beyond the Bm region). In the case where (a1=0.2, b1=1) versus the case where (a1=0.2, b1=1.2), the starvation effect shifts to higher brightness pixel when b1 is increased. In the case where (1=0.2, b1=1) versus the case where (a1=0.3, b1=1), the starvation effect has a larger magnitude when a1 is increased but the location above which the starvation effect starts stays the same since b1 is the same in each case. In the case where (a1=0.6, b1=1.3), this indicates a situation where the rise and fall time effect add to the problem of starvation for some of the highest brightness pixels when exposure time is short, that the modified dynamic printhead brightness of some of the highest brightness pixels can actually be lower brightness that some of the lower brightness pixels which are not affected by the rise and fall time of the current pulse.

The Bd,i is used as the modified dynamic effective pixel brightness of pixel i for the uniformity correction calculation. From the stored intensity values, the LEDs can be assigned or binned into 256 bins in which the LEDs for each bin have generated approximately similar intensity values. After binning of the LED brightness based on the pixel effective brightness as indicated in step 128, a bin look up table (BIN LUT) and a correction look up table (COR LUT) are generated in step 130 and stored in memory in step 132. These BIN LUTs and COR LUTs can be used for printhead exposure uniformity correction with gray levels.

The steady-state current starvation effects can be compensated for by measuring the LED irradiance under all-on printhead condition (step 110). The steady-state current starvation measurement for a given LED or group of LEDs (Bcs,i) can be calculated, as indicated in step 120, by measuring the LED irradiance of the all-on condition (Ball) and subtracting the contribution of a pattern with all of the LEDs on less the LED or LEDs of interest (Ball−i):

$$B_{cs,i} = B_{all} - B_{all-i} \quad (5)$$

The various modifications to the LED pixel irradiance can then be combined by multiplying the integrated irradiance Bi by each of the compensation vectors Pi, Si, Be,j, and Bcs,j after normalizing each vector by the mean irradiance level. This is indicated in step 122.

The present invention is also applicable to other types of non-impact printers including array inkjet printers and thermal printers. For an array inkjet printhead, droplet size difference and pixel placement error are similar to exposure size and pixel centroid location errors discussed herein for LED printheads. Adjustment factors for droplet size difference and pixel placement error can be determined in a manner similar to determining adjustment factors for pixel size error and pitch error for LED printheads. For a thermal printhead, the pixel to pixel power difference is similar to that for the LED pixel brightness difference. The thermal latency and loading effect is similar to that of the dynamic correction for pixel exposure at multiple on-times with high current loading.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments of the present invention are possible without departing from the spirit and scope of the present invention.

What is claimed is:

1. A method for calibrating a printer including a light-emitting diode (LED) printhead for non-uniformity on an image plane, wherein the LED recording elements are arranged in a plurality of arrays, the method comprising the steps:
   measuring a plurality of characteristics associated with each recording element;
   determining from the measured characteristics a plurality of parameters associated with each recording element;
   combining an adjustment factor for each of the plurality of parameters to determine an adjusted pixel brightness for each recording element;
   assigning correction factors to each recording element to correct for the adjusted pixel brightness for each recording element on the image plane; and storing the correction factors in a memory associated with the LED printhead,
   wherein the step of determining a plurality of parameters comprises determining a dynamic vector, and
   wherein the dynamic vector is configured to address a dynamic current starvation effect dependent upon a recording element exposure time relative to a rise and fall time of a light-output pulse from the LED printhead.

2. The method for calibrating a printer including a light-emitting diode (LED) printhead of claim 1, wherein the step of measuring a plurality of characteristics comprises measuring an integrated pixel brightness for each recording element on the image plane.

3. The method for calibrating a printer including a light-emitting diode (LED) printhead of claim 1, wherein the step of measuring a plurality of characteristics comprises measuring a power centroid for each of a pair of recording elements on the image plane.

4. The method for calibrating a printer including a light-emitting diode (LED) printhead of claim 1, wherein the step of measuring a plurality of characteristics comprises measuring a pixel size for each recording element on the image plane based on a pixel brightness distribution of the recording element and a pre-selected power threshold value.

5. The method for calibrating a printer including a light-emitting diode (LED) printhead of claim 1, wherein the step of measuring a plurality of characteristics comprises measuring a recoding element exposure at multiple on-times with high current loading.

6. The method for calibrating a printer including a light-emitting diode (LED) printhead of claim 1, wherein the step of measuring a plurality of characteristics comprises measuring a recording element exposure under an all recording elements on condition.

7. The method for calibrating a printer including a light-emitting diode (LED) printhead of claim 1, wherein the step of determining a plurality of parameters comprises determining a pixel brightness for each recording element on the image plane.

8. The method for calibrating a printer including a light-emitting diode (LED) printhead of claim 1, wherein the step of determining a plurality of parameters comprises determining a pitch representing a difference between power centroids of recording elements on the image plane.

9. The method for calibrating a printer including a light-emitting diode (LED) printhead of claim 1, wherein the step of determining a plurality of parameters comprises determining a pixel size for each recording element on the image plane.

10. The method for calibrating a printer including a light-emitting diode (LED) printhead of claim 1, wherein the step of determining a plurality of parameters comprises determining a steady-state starvation vector for each recording element on the image plane.

11. The method for calibrating a printer including a light-emitting diode (LED) printhead of claim 8, wherein the adjustment factor for pitch is a function of pitch error.

12. The method for calibrating a printer including a light-emitting diode (LED) printhead of claim 11, wherein the pitch error is the difference between the measured pitch and a nominal pitch for each pair of recording elements.

13. The method for calibrating a printer including a light-emitting diode (LED) printhead of claim 9, wherein the adjustment factor for pixel size is a function of size error.

14. The method for calibrating a printer including a light-emitting diode (LED) printhead of claim 13, wherein the size error is the difference between a measured pixel size and a nominal pixel size for each recording element.

15. The method for calibrating a printer including a light-emitting diode (LED) printhead of claim 1, wherein the adjustment factors for a pitch and a pixel size for each recording element are used to determine an effective pixel brightness for each recording element.

16. The method for calibrating a printer including a light-emitting diode (LED) printhead of claim 1, wherein the adjustment factors for a pitch and pixel size, and an exposure time for each recording element are used to determine a dynamic effective pixel brightness for each recording element.

17. The method for calibrating a printer including a light-emitting diode (LED) printhead of claim 16, wherein the dynamic effective pixel brightness is a function of a targeted mean power density for each recording element.

18. The method for calibrating a printer including a light-emitting diode (LED) printhead of claim 1, wherein the adjusted pixel brightness compensates for a steady state current starvation measurement for each recording element.

19. The method for calibrating a printer including a light-emitting diode (LED) printhead of claim 18, wherein the steady current starvation measurement is determined by measuring the pixel brightness with all recording elements on and subtracting the pixel brightness with all recording elements on except for the recording element whose steady state starvation measurement is being determined.

20. The method for calibrating a printer including a light-emitting diode (LED) printhead of claim 1, wherein the correction factors are stored in a look-up table in memory.

21. A printer apparatus comprising:
   a printhead that includes a plurality of contiguous recording elements arranged in a series of arrays wherein the plurality of contiguous recording elements in each array are generally uniformly spaced apart in the array at a nominal pitch distance and each recording element has a nominal size and a generally uniform brightness;
   a logic and control unit for determining variations in pitch, pixel size and power density for each recording element from the nominal pitch, pixel size and generally uniform brightness and generating a plurality of adjustment factors that are combined to determine an adjusted brightness for each recording element;

a memory for storing a plurality of correction factors assigned to each recording element to correct for the adjusted brightness of each recording element on an image plane; and a plurality of current drivers for providing current to each recording element for an exposure time that is based on the corresponding correction factors for each recording element stored in memory, wherein the memory stores a dynamic vector configured to address a dynamic current starvation effect dependent upon a recording element exposure time relative to a rise and fall time of a light-output pulse from the printhead.

22. The printer apparatus of claim 21, wherein the logic and control unit determines variation in pitch based on a pitch error that represents a difference between a measured pitch and a nominal pitch for each pair of recording elements.

23. The printer apparatus of claim 21, wherein the logic and control unit determines variation in pixel size based on a size error that represents a difference between a measured pixel size and a nominal pixel size for each recording element.

24. The printer apparatus of claim 21, wherein the logic and control unit determines the adjusted brightness based on a pitch error, a size error, and an exposure time for each recording element.

25. The printer apparatus of claim 21, wherein the logic and control unit wherein the adjusted brightness compensates for a steady state current starvation measurement for each recording element.

26. The printer apparatus of claim 21, wherein the plurality of contiguous recording elements are light-emitting diodes.

27. A printer apparatus comprising:

a printhead that includes a plurality of contiguous recording elements arranged in a series of arrays wherein the plurality of contiguous recording elements in each array are generally uniformly spaced apart in the array;

a logic and control unit for determining a variation from a nominal value for each of a plurality of parameters for each recording element and generating a plurality of adjustment factors that are logically combined for each recording element;

a memory for storing a plurality of correction factors assigned to each recording element to correct for an effect of the combined plurality of adjustment factors on an image plane; and a plurality of drivers for modulating each recording element based on the corresponding correction factors for each recording element stored in memory, wherein the memory stores a dynamic vector configured to address a dynamic current starvation effect dependent upon a recording element exposure time relative to a rise and fall time of a light-output pulse from the printhead.

28. The printer apparatus of claim 27, wherein the printhead includes a plurality of contiguous light-emitting diode (LED) recording elements.

29. The printer apparatus of claim 28, wherein the logic and control unit determines a variation from a nominal value for at least one of a pixel pitch, a pixel size and an exposure time for each light-emitting diode.

30. The printer apparatus of claim 28, wherein the logic and control unit compensates for a steady state current starvation measurement for each LED recording element.

31. The printer apparatus of claim 27, wherein the plurality of drivers are current drivers that provide current to each LED recording element for an exposure time based on the corresponding correction factors for each LED recording element.

32. The printer apparatus of claim 27, wherein the printhead includes a plurality of contiguous inkjet nozzles arranged in a series of arrays.

33. The printer apparatus of claim 32, wherein the logic and control unit determines an adjustment factor for a droplet size difference.

34. The printer apparatus of claim 32, wherein the logic and control unit determines an adjustment factor for a pixel placement error.

35. The printer apparatus of claim 27, wherein the printhead includes a thermal head.

36. The printer apparatus of claim 32, wherein the logic and control unit determines an adjustment factor for a pixel to pixel power difference.

37. The printer apparatus of claim 32, wherein the logic and control unit determines an adjustment factor for a thermal latency and loading effect.

38. A method for calibrating a printer including a light-emitting diode (LED) printhead for non-uniformity on an image plane, wherein the LED recording elements are arranged in a plurality of arrays, the method comprising the steps:

measuring a plurality of characteristics associated with each recording element;

determining from the measured characteristics a plurality of parameters associated with each recording element;

combining an adjustment factor for each of the plurality of parameters to determine an adjusted brightness for each recording element;

assigning correction factors to each recording element to correct for the adjusted brightness for each recording element on the image plane; and storing the correction factors in a memory associated with the LED printhead, wherein the adjustment factors for a pitch and pixel size, and an exposure time for each recording element are used to determine a dynamic effective pixel brightness for each recording element, and wherein the dynamic effective brightness is a function of a targeted mean brightness for each recording element.

39. A method for calibrating a printer including a light-emitting diode (LED) printhead for non-uniformity on an image plane, wherein the LED recording elements are arranged in a plurality of arrays, the method comprising the steps:

measuring a plurality of characteristics associated with each recording element;

determining from the measured characteristics a plurality of parameters associated with each recording element;

combining an adjustment factor for each of the plurality of parameters to determine an adjusted brightness for each recording element;

assigning correction factors to each recording element to correct for the adjusted brightness for each recording element on the image plane; and storing the correction factors in a memory associated with the LED printhead, wherein the adjusted brightness compensates for a steady state current starvation measurement for each recording element, and wherein the steady current starvation measurement is determined by measuring the brightness with all recording elements on and subtracting the brightness with all recording elements on except for the recording element whose steady state starvation measurement is being determined.

40. The printer apparatus of claim 24, wherein the adjusted brightness is a function of a targeted mean power density for each recording element.

* * * * *